United States Patent
Marwood et al.

(10) Patent No.: US 11,019,366 B2
(45) Date of Patent: May 25, 2021

(54) IMAGE COMPRESSION AND DECOMPRESSION USING TRIANGULATION

(71) Applicant: GOOGLE LLC, Mountain View, CA (US)

(72) Inventors: David Marwood, Sunnyvale, CA (US); Michele Covell, Woodside, CA (US); Shumeet Baluja, La Jolla, CA (US); Nicholas Milo Johnston, San Jose, CA (US); Pascal Massimino, Orsay (FR)

(73) Assignee: GOOGLE LLC, Mountain View, CA (US)

( * ) Notice: Subject to any disclaimer, the term of this patent is extended or adjusted under 35 U.S.C. 154(b) by 68 days.

(21) Appl. No.: 16/413,992

(22) Filed: May 16, 2019

(65) Prior Publication Data

US 2019/0356931 A1    Nov. 21, 2019

Related U.S. Application Data

(60) Provisional application No. 62/673,036, filed on May 17, 2018.

(51) Int. Cl.
*G06T 9/00*  (2006.01)
*H04N 19/90*  (2014.01)
*H04N 19/186*  (2014.01)
*H04N 19/176*  (2014.01)

(52) U.S. Cl.
CPC ............ *H04N 19/90* (2014.11); *G06T 9/001* (2013.01); *H04N 19/176* (2014.11); *H04N 19/186* (2014.11)

(58) Field of Classification Search
CPC .... H04N 19/90; H04N 19/176; H04N 19/186; G06T 9/001
See application file for complete search history.

(56) References Cited

U.S. PATENT DOCUMENTS

| | | | |
|---|---|---|---|
| 6,614,425 B1 * | 9/2003 | Burdon | G06T 9/001 345/418 |
| 6,897,977 B1 * | 5/2005 | Bright | G06T 9/001 358/1.18 |
| 2006/0008144 A1 * | 1/2006 | Prasad | G06T 9/00 382/173 |

(Continued)

OTHER PUBLICATIONS

Hoppe, Hugues, et al. "Mesh optimization", 1993, Proceedings of the 20th annual conference on Computer graphics and interactive techniques, 8 pages (Year: 1993).*

(Continued)

*Primary Examiner* — David F Dunphy
(74) *Attorney, Agent, or Firm* — Brake Hughes Bellermann LLP

(57) ABSTRACT

An encoder system can include a pixel grid generator to receive an image having a first dimension, generate a grid having a second dimension, add a plurality of points to positions on the grid, and map a plurality of pixels of the image to the plurality of points. The encoder system can include a color module to assign a color to each of the plurality of points using a color table, a triangulation module to generate a plurality of vertices based on the plurality of points and triangulate the grid using the vertices, and a compression module to compress the vertices as a set of compressed vertex positions and a set of vertex colors.

20 Claims, 8 Drawing Sheets

(56) References Cited

U.S. PATENT DOCUMENTS

2011/0046923 A1 2/2011 Lee et al.
2016/0234501 A1* 8/2016 Minaee ............... H04N 19/186

OTHER PUBLICATIONS

Agustsson, et al., "Generative Adversarial Networks for Extreme Learned Image Compression", arXiv preprint, arXiv:1804.02958, Oct. 23, 2018, pp. 1-27.
Apple Inc., "Using HEIF or HEVC Media on Apple Devices", https://support.apple.com/en-us/HT207022, Apr. 12, 2019, pp. 1-3.
Ballé, et al., "End-to-End Optimized Image Compression", arXiv:1611.01704v3, Mar 3, 2017, pp. 1-27.
Ballé, et al., "Variational Image Compression With a Scale Hyperprior", arXiv:1802.01436v2, May 1, 2018, pp. 1-23.
Bougleux, et al., "Image Compression with Anisotropic Triangulations", IEEE 12th International Conference on Computer Vision, Kyoto, 2009, pp. 2343-2348.
Bryt, et al., "Compression of Facial Images Using the K-SVD Algorithm", Journal of Visual Communication and Image Representation, vol. 19, No. 4, May 2008, pp. 270-282.
Cabral, et al., "The Technology Behind Preview Photos", https://code.facebook.com/posts/991252547593574/the-technology-behind-previewphotos/, 2015.
Cavigelli, et al., "CAS-CNN: A Deep Convolutional Neural Network for Image Compression Artifact Suppression", arXiv:1611.07233v1, Nov. 22, 2016, 8 pages.
Cottrell, et al., "Principal Components Analysis of Images Via Back Propagation", Visual Communications and Image Processing, vol. 1001, 1988, pp. 1070-1077.
International Search Report and Written Opinion for International Application No. PCT/US2019/032604, dated Jul. 4, 2019, 17 pages.
Davoine, et al., "Fractal Image Compression Based on Delaunay Triangulation and Vector Quantization", IEEE Transactions on Image Processing, vol. 5, No. 2, Feb. 1996, pp. 338-346.
Lehner, Burkhard et al., "Image Compression Using Data-Dependent Triangulations", Advances in Visual Computing, pp. 351-362, Nov. 26, 2007, XP019083513.
Demaret, et al., "Image Compression by Linear Splines Over Adaptive Triangulations", Signal Processing, vol. 86, No. 7, Jul. 2006, pp. 1604-1616.
Duda, et al., "The Use of Asymmetric Numeral Systems as an Accurate Replacement for Huffman Coding", Picture Coding Symposium (PCS), Cairns, QLD, 2015, pp 65-69.
Galperin, et al., "Succinct Representations of Graphs", Information and Control, vol. 56, No. 3, 1983, pp. 183-198.
Google Developers, "A New Image Format for the Web", https://developers.google.com/speed/webp/, Feb. 11, 2019, pp. 1-2.
Google Developers, "Comparative Study of WebP, JPEG and JPEG 2000", https://developers.google.com/speed/webp/docs/c_study, Sep. 2010, pp. 1-6.
Google Developers, "WebP Compression Study", https://developers.google.com/speed/webp/docs/webp_study, Jan. 19, 2019, pp. 1-7.
Hoeltgen, et al., "Clustering-Based Quantisation for PDE-Based Image Compression", Signal, Image and Video Processing, vol. 12, No. 3, Springer-Verlag London Ltd., Sep. 14, 2017, 9 pages.
Cuadros-Vargas, A.J. et al., "Generating Segmented Quality Meshes from Images", Journal of Mathematical Imaging and Vision, vol. 33, No. 1, pp. 11-23, Jun. 27, 2008, XP019679313.
Isola, et al., "Image-to-Image Translation with Conditional Adversarial Networks", arXiv:1611.07004v2, Nov. 22, 2017, pp. 1-17.
Jiang, "Image Compression with Neural Networks—A Survey", Signal Processing: Image Communication, vol. 14, No. 9, 1999, pp. 737-760.
Kingma, et al., "Adam: A Method for Stochastic Optimization", arXiv:1412.6980v9, Jan. 30, 2017, pp. 1-15.
Kirkpatrick, et al., "Optimization by Simulated Annealing", Science, vol. 220, No. 4598, May 13, 1983, pp. 671-680.
Kramer, A. Mark., "Nonlinear Principal Component Analysis Using Autoassociative Neural Networks", AIChE Journal, vol. 37, No. 2, Feb. 1991, pp. 233-243.
Mackay, J.C. David., "Information Theory, Inference and Learning Algorithms", Chapter 6 Stream Codes, Cambridge University Press, Jun. 26, 2003, 23 pages.
Marwood, et al., "Representing Images in 200 Bytes: Compression Via Triangulation", 25th IEEE International Conference on Image Processing (ICIP), Athens, 2018, pp. 405-409.
Monga, Vishal et al., "Algorithms for Color Look-Up-Table (LUT) Design Via Joint Optimization of Node Locations and Output Values", 2010 IEEE International Conference on Acoustics Speech and Signal Processing, pp. 998-1001, Mar. 14, 2010, XP031697268.
Muhlenbein, Heinz, "How Genetic Algorithms Really Work: Mutation and Hillclimbing", 1992, pp. 1-11.
Newell, et al., "Stacked Hourglass Networks for Human Pose Estimation", European Conference on Computer Vision, Springer, Jul. 26, 2016, 17 pages.
Orzan, et al., "Diffusion Curves: A Vector Representation for Smooth-Shaded Images", Communications ACM, vol. 56, No. 7, 2013, pp. 101-108.
Rippel, et al., "Real-Time Adaptive Image Compression", International Conference on Machine Learning (ICML), May 16, 2017, 16 pages.
Ronneberger, et al., "U-Net: Convolutional Networks for Biomedical Image Segmentation", Computer Science Department and BIOSS Centre for Biological Signalling Studies, University of Freiburg, Germany, May 18, 2015, pp. 1-8.
Russakovsky, et al., "ImageNet Large Scale Visual Recognition Challenge", arXiv:1409.0575v1, Sep. 1, 2014, pp. 1-37.
Russakovsky, et al., "ImageNet Large Scale Visual Recognition Challenge", International Journal of Computer Vision, vol. 115, No. 3, 2015, 42 pages.
Salimans, et al., "Evolution Strategies as a Scalable Alternative to Reinforcement Learning", arXiv:1703.03864v2, Sep. 7, 2017, 13 pages.
Schmaltz, et al., "Beating the Quality of JPEG 2000 with Anisotropic Diffusion", Springer-Verlag Berlin Heidelberg, 2009, pp. 452-461.
Svoboda, et al., "Compression Artifacts Removal Using Convolutional Neural Networks", Journal of WSCG, vol. 24, Issue 2, May 2, 2016, 10 pages.
Szegedy, et al., "Inception-v4, Inception-ResNet and the Impact of Residual Connections on Learning", arXiv:1602.07261v2, Aug. 23, 2016, pp. 1-12.
Theis, et al., "Lossy Image Compression With Compressive Autoencoders", International Conference on Learning Representations, Mar. 1, 2017, pp. 1-19.
Toderici, et al., "Full Resolution Image Compression with Recurrent Neural Networks", IEEE Conference on Computer Vision and Pattern Recognition (CVPR), Honolulu, HI, 2017, pp. 5435-5443.
Toderici, et al., "Variable Rate Image Compression with Recurrent Neural Networks", ICLR 2016, retrieved from https://arxiv.org/abs/1511.06085, Mar. 1, 2016, pp. 1-12.
Turan, Gyorgy, "On the Succinct Representation of Graphs", Discrete Applied Mathematics, vol. 8, No. 3, 1984, pp. 289-294.
Wang, et al., "Image Quality Assessment: From Error Visibility to Structural Similarity", IEEE Transactions On Image Processing, vol. 13, No. 4, Apr. 2004, pp. 1-14.
Watkins, et al., "Image Compression: Sparse Coding vs. Bottleneck Autoencoders", 31st Conference on Neural Information Processing Systems, Long Beach, CA, USA, Oct. 26, 2017, 4 pages.
Yu, et al., "Deep Convolution Networks for Compression Artifacts Reduction", arXiv:1608.02778v1, Aug. 9, 2016, pp. 1-13.
Zhu, et al., "Dictionary Based Surveillance Image Compression", Journal of Visual Communication and Image Representation, vol. 31, 2015, pp. 225-230.
Zhu, et al., "Unpaired Image-to-Image Translation Using Cycle-Consistent Adversarial Networks", arXiv:1703.10593v1, Mar. 30, 2017, pp. 1-18.

(56) References Cited

OTHER PUBLICATIONS

Yuen, Kevan et al., "An Occluded Stacked Hourglass Approach to Facial Landmark Localization and Occlusion Estimation", Cornell University Library, 11 pages, Feb. 5, 2018, XP081219375.

* cited by examiner

IMAGE COMPRESSION AND DECOMPRESSION USING TRIANGULATION

CROSS REFERENCE TO RELATED APPLICATION

This application is a Nonprovisional of, and claims priority to, U.S. Patent Application No. 62/673,036, filed May 17, 2018, entitled "Image Preview Methods and Apparatus", which is incorporated by reference herein in its entirety.

FIELD

Embodiments relate to image compression using an adaptive triangulation technique.

BACKGROUND

An increasing portion of interne traffic is dominated by requests from mobile devices with limited and often metered bandwidth constraints. Responding to these requests often includes communicating small images (e.g., thumbnails). Therefore, reducing the image size (e.g., a number of bytes used to store the image) of small images using various compression techniques is desirable. For example, compression standards (e.g., Joint Photographic Experts Group (JPEG)) have established standard approaches for image compression. However, JPEG and other compression standards do not significantly or sufficiently compress small images. Accordingly, these deficiencies have been addressed with domain specific techniques, specialized for image characteristics (e.g., faces, satellite imagery, smooth synthetic images, surveillance and/or the like). Therefore, there is a need for efficient compression techniques that can compress images (e.g., small images) independent of image characteristics.

SUMMARY

Example embodiments describe systems and methods to compress and decompress images (e.g., thumbnails) using an adaptive triangulation technique.

In a general aspect, an encoder system includes a pixel grid generator configured to receive an image having a first dimension, generate a grid having a second dimension, add a plurality of points to positions on the grid, and map a plurality of pixels of the image to the plurality of points. The encoder system further includes a color module configured to assign a color to each of the plurality of points using a color table, a triangulation module configured to generate a plurality of vertices based on the plurality of points and triangulate the grid using the vertices, and a compression module configured to compress the vertices as a set of compressed vertex positions and a set of vertex colors.

In another general aspect, a method of compressing an image includes receiving an image having a first dimension, generating a grid having a second dimension, adding a plurality of points to positions on the grid, mapping a plurality of pixels of the image to the plurality of points, assigning a color to each of the plurality of points using a color table, generating a plurality of vertices based on the plurality of points, triangulating the grid using the vertices, and compressing the vertices as a set of compressed vertex positions and a set of vertex colors.

Implementations can include one or more of the following features. For example, the second dimension is between four (4) and 400 times smaller than the first dimension. The second dimension is M, the grid can include M columns and M rows, the positions on the grid can be located at each block of the grid, a block being at an intersection of a row and a column of the grid, and the adding of the plurality of points to the positions on the grid can include one of inserting a point at each of the positions on the grid or inserting the plurality of points at a portion of the positions on the grid. The received image is a first image, the second dimension is M, the grid can include M columns and M rows, the positions on the grid can be located at each block of the grid, a block being at an intersection of a row and a column of the grid, and the adding of the plurality of points to the positions on the grid can include inserting a threshold number of points into random positions on the grid, generating a second image using the points on the grid, comparing the second image to the first image, and in response to determining the comparison results in a quality that is greater than a threshold quality difference, the threshold number of points are repositioned on the grid.

For example, the color table can be generated based on the received image, and the color table can include between 2 and 16 colors. The color table can be generated based on the received image, and the color table can include 6 colors. The triangulation module can use a Delaunay Triangulation technique to triangulate the grid. The received image can be a first image, the encoder system further including an image generator configured to generate a second image using the triangulated grid and a color associated with the vertices. The generating of the second image can include painting triangles generated by the triangulation module based on a color associated with each a plurality of vertices.

For example, the received image is a first image, the encoder system further including an image generator configured to generate a second image using the triangulated grid and a color associate with the vertices; and a test module configured to perform a quality test based on the first image and the second image, determine whether the second image satisfies at least one criterion based on the quality test and a size of the second image, wherein the at least one criterion includes a maximum size and quality error, in response to determining the second image does not satisfy the at least one criterion, select a vertex from the plurality of vertices and remove the selected vertex from the plurality of vertices and return processing to the triangulation module. The received image can be a first image, the encoder system further including an image generator configured to generate a second image using the triangulated grid and a color associate with the vertices, and a test module configured to perform a quality test based on the first image and the second image, determine whether the second image satisfies at least one criterion based on the quality test and a size of the second image, wherein the at least one criterion includes a maximum size and quality error, in response to determining the second image does not satisfy the at least one criterion, at least one of displacing a vertex of the plurality vertices, adding a vertex to the plurality vertices, removing a vertex from the plurality of vertices, reassigning the color associated with at least one of the plurality of points, removing one of the colors of the color table, and modifying one of the colors of the color table, and return processing to the triangulation module.

In yet another general aspect, a method of decompressing a compressed image includes receiving a compressed image file, the compressed image file including at least one of a header, a compressed color table, a compressed color table index, and a compressed triangulation, decompressing at least one of the compressed color table, the compressed color table index, and the compressed triangulation, generating a grid having an M×M dimension based on a grid size, assigning one of a plurality points to each position of the grid based on the decompressed triangulation file, assigning a color index value to each of the plurality of points based on the decompressed triangulation file, mapping a color to each of the plurality of points based on an associated color index value, triangulating the grid using the plurality of points as vertices, and generating a reconstructed image based on the vertices and triangles associated with the triangulation.

Implementations can include one or more of the following features. For example, improving a quality associated with the reconstructed image using Stacked-Hourglass network, wherein the Stacked-Hourglass network includes at least two hourglasses, and an intermediate supervision is applied using an intermediate loss module that can be split off an output of each Hourglass. Generating the reconstructed image can include painting triangles generated by the triangulation based on a color associated with each a plurality of vertices, and at least one of the triangles generated by the triangulation painted using an interpolation technique.

BRIEF DESCRIPTION OF THE DRAWINGS

Example embodiments will become more fully understood from the detailed description given herein below and the accompanying drawings, where like elements are represented by like reference numerals, which are given by way of illustration only and thus are not limiting of the example embodiments.

Figure 1:
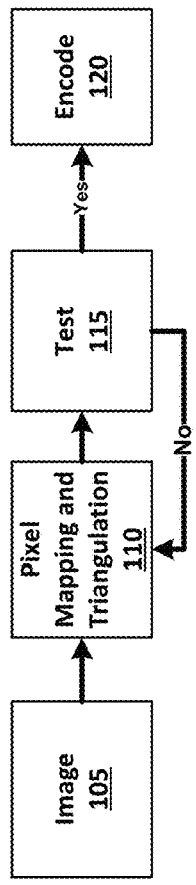
FIG. 1 is a block diagram illustrating a data flow according to an example implementation.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Typical compression techniques use subdivision of the image into a set of blocks. The implementation described herein, which is based on triangulation, does not use a block implementation nor a predefined, or uniform, spacing of triangles over the image. Instead, a limited set of vertices can be assigned a color index from a small (e.g., a limited number of colors) colormap. For example, similar to a mesh including a plurality of triangles that is sometimes used in computer graphics and animation, a set of triangles interconnected at edges and/or corners can be used to represent the image. Each corner of a triangle can be referred to as a vertex. Therefore, the image can also be represented by a set of vertices (a set of corners of the triangles) and a location for each vertex in a two dimensional mesh or grid. Further, the two dimensional mesh or grid can be of a limited size as part of compressing the image. The limited size of the two dimensional mesh or grid can also limit the size of the set of vertices (e.g., limit the number of triangles and the number of associated vertices).

In addition, a colormap can be used to represent or store the colors for pixels in the image. As a result, each vertex of the aforementioned vertices can be associated with an indicator (e.g., a number, a binary integer, an index, or the like) that can be used to look-up a color for a vertex in the colormap. In an implementation (e.g., as part of compressing the image), the colormap can be limited (e.g., colors combined, colors filtered by frequency of instances in the image, by predefined settings, and/or the like) to a relatively (as compared to the numbers of colors in the image) small number of colors (e.g., less than 20 colors). Accordingly, the indicator for associating a vertex with a color in the colormap can map to one of the limited number of colors in the colormap.

Further, color interpolation between each of the triangle vertices can be used to fill in the triangles as part of generating (or to help generate) the resultant image. For example, if each of the three vertices of a triangle map to a same color in the colormap (e.g., the colormap including a limited number of colors) then the triangle can be filled in with one color (e.g., the color associated with the three vertices). However, if each of the three vertices of a triangle map to a different color in the colormap, then the triangle can be filled in using an interpolation of the different colors. In some implementations, more triangles can be devoted to the complex (e.g., high entropy, high color variability, high texture variability, and/or the like) regions of the image. Triangulation can be used in a diverse set of techniques for image compression. In addition, compression/decompression techniques can use deep neural networks.

Therefore, implementations described herein can compress small images independent of image characteristics. However, it will be appreciated that implementations described here are not restricted to compression of small images and can be applied to images regardless of size. In addition, compression resulting in a reduced image size can help with storage requirements associated with storing large numbers (e.g., billions) of small images that are typically accessed in response to requests from mobile devices.

In some implementations, there can be at least two components of the implementation described herein. In some implementations, the first is creating an effective triangulation and the second is efficiently encoding the triangulation. In some implementations, the triangulation component can be implemented as two pieces that interact by selecting where to place the triangulation's vertices and assigning a single color to each vertex. In some implementations, for transmission efficiency, the number of vertices and the total number of unique colors can be reduced or minimized. Further, in some implementations the first component can implement a generate-and-test paradigm. The generate-and-test paradigm can be used to repeatedly regenerate the triangulation's vertices and reassign the single color to each vertex color, fill the resultant triangles using the vertex colors and then test or compare the resultant generated image to the original image and/or a previously generated image.

FIG. 1 is a block diagram illustrating a data flow according to an example implementation. As shown in FIG. 1, an image 105 having data (e.g., pixel position and color information) is input to a pixel mapping and triangulation process 110. In the pixel mapping and triangulation process 110 the vertices are generated/identified and positioned on a M×M grid based on the pixel positions. Each vertex is assigned a color and each triangle is colored based on the assigned colors of the corresponding vertices. A new image is then generated using the triangles. The new image is tested (115) and if the new image satisfies a predetermined criterion, the new image is encoded (120). If the new image does not satisfy the predetermined criteria, the new image is reprocessed in the pixel mapping and triangulation process 110. Reprocessing can include adding vertices, subtracting vertices, changing colors, adding colors and/or the like. The pixel mapping and triangulation process 110 and the test 115 can be repeated until the generated image satisfies the at least one predetermined criterion.

Figure 2:
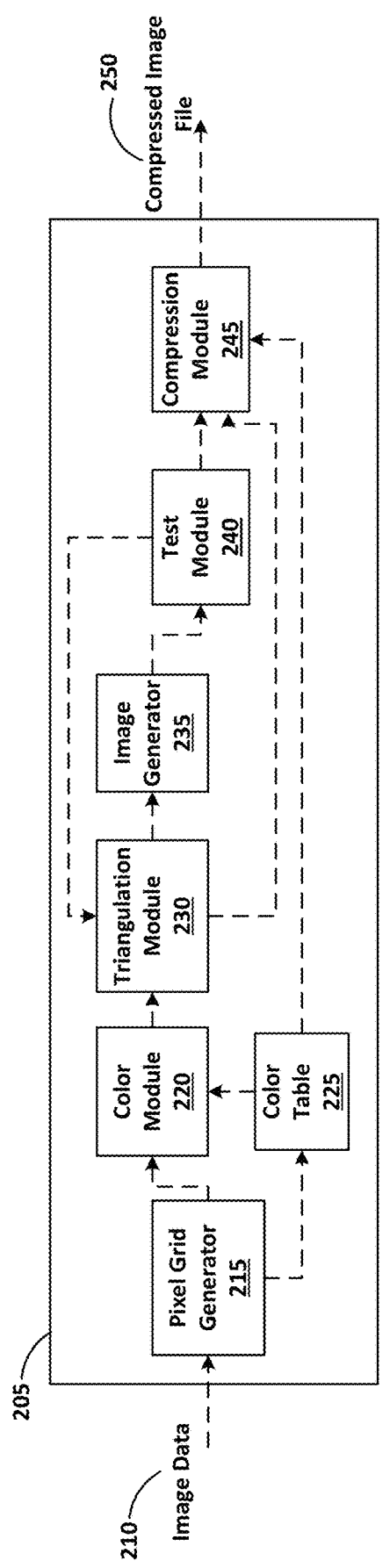
FIG. 2 illustrates a block diagram of an encoder system according to at least one example embodiment.

FIG. 2 illustrates a block diagram of an encoder system according to at least one example embodiment. As shown in FIG. 2, an encoder system 205 includes a pixel grid generator 215, a color module 220, a color table 225, a triangulation module 230, an image generator 235, a test module 240, and a compression module 245.

The encoder system 205 can receive an image 210 and generate a compressed image file 250. The image 210 can include image data (e.g., image size, image dimensions (e.g., x and y dimensions and/or a grid dimension), a number of pixels, pixel location, pixel color, pixel texture, and the like). The compressed image file 250 can include compressed data corresponding to the image 210. The compressed data corresponding to the image 210 can be used to generate a reconstructed image corresponding to the image 210. Therefore, the compressed image file 250 can include a pixel grid, a color table, compressed data corresponding to triangulation vertices and/or the like (with, preferably, one or more of these having been compressed to a reduced or minimum number of bits).

The pixel grid generator 215 can receive the image 210. In an example implementation, the image 210 is a small image (e.g., a thumbnail) of size N×N (e.g., 221×221). An image of size N×N (and/or N1×N2 where N1 differs from N2) can be associated with an N×N grid including N columns and N rows. Positions on the N×N grid can be located at each block of the N×N grid. A block can be located at an intersection of a row and a column of the N×N grid. The pixel grid generator 215 can include (generate and/or use) a predetermined M×M (and/or M1×M2 where M1 differs from M2) grid. An M×M grid can include M columns and M rows. Positions on the M×M grid can be located at each block of the M×M grid. A block can be located at an intersection of a row and a column of the M×M grid.

In some implementations, M«N. Therefore, the M×M grid can be much smaller than the N×N grid. For example, M can be between 2 and 20 times smaller than N. Accordingly, M×M can be between 4 and 400 times smaller than N×N. However, the M×M grid can be the same size as the N×N grid, a smaller size than the N×N grid or a larger size than the N×N grid. In some implementations, the M×M grid can be predetermined based on a target number of bytes (e.g., 200 bytes). In some implementations, the M×M grid can be predetermined based on a parameter (e.g., an input to the encoder system 205) for adjusting the compression rate.

The pixel grid generator 215 can be further configured to assign a plurality of points to respective positions on the M×M grid (a position on the M×M grid could be, for example, a center of a block as described above, an (X,Y) location that can be at an intersection of four blocks, along a line that is shared by two blocks, and/or the like). In other words, selecting or identifying a plurality of positions in the M×M grid, and these selected/identified positions can be referred to as points. A point(s) assigned to a position on the M×M grid can be referred to as a point, points and/or points on the M×M grid. In a subsequent operation (e.g., triangulation), a point can become a vertex of a triangle. The pixel grid generator 215 can be further configured to map pixels of the image 210 to the points on the M×M grid. For example, if the M×M grid is a smaller size than the N×N grid (corresponding to the image 210), mapping the pixels of the image 210 to points on the M×M grid can include mapping a subset of the pixels (e.g., based on location proximity) of the image 210 to points on the M×M grid.

The color module 220 can be configured to assign each of the points on the M×M grid a color based on a color of a corresponding pixel in the image 210. The color can be selected from color table 225. The color table 225 can include a colormap including a limited number of colors. For example, the color table 225 can include a colormap with 8-16 colors. Further, each of the colors of the pixels of the image 210 can be mapped to one of the 8-16 colors of the colormap.

The triangulation module 230 can be configured to triangulate the points on the M×M grid. In other words, the triangulation module 230 can be configured to generate (or identify or determine) a plurality of triangles using the points on the M×M grid as vertices for the triangles. For example, a Delaunay triangulation technique can be used. Using a Delaunay triangulation technique, each triangle that is generated by the triangulation module 230 does not include any other points within the generated triangle and no side or edge of a triangle intersects a vertex of another triangle. Therefore each point corresponding to a pixel is used as a vertex in at least one triangle. Other triangulation techniques are possible. For example, some triangulation techniques can include at least one point within a generated triangle. These techniques ignore these internal points in subsequent processing.

Image generator 235 can be configured to generate (or render) an image using the triangulation and the color assigned to the vertex via the corresponding point on the M×M grid. Generating the image can include filling in a color or painting (herein after called paint, painted or painting) each triangle generated by the triangulation module 230 based on the color assigned to each vertex of the triangle. The generated image can be smaller (e.g., fewer bytes to store, fewer columns and/or rows) as compared to image 210. In other words, the generated image can be M×M. The generated image can be fully covered by triangles (e.g., no area of the M×M grid includes open space or space not within one of the triabgles).

In some implementations, at least one triangle can have vertices having different colors. For example, a triangle can have two vertices assigned the color green via the corresponding point on the M×M grid and the third vertex assigned the color blue via the corresponding point on the M×M grid. Accordingly, the triangle can be painted using an interpolation (e.g., linear interpolation) technique. In other words, the triangle can be painted with a varying or blended color. For example, the center of the triangle may be painted green/blue and be painted bluer approaching the blue vertex and be painted greener approaching the green vertices. In addition to linear interpolation, in some implementations, numerous other methods of interpolating the colors to paint the triangles (e.g. cubic, multiquadratic, quintic) can be used.

The image generated by the image generator 235 may then be tested by the test module 240. In one or more implementations, an image quality test can be performed. For example, a peak signal-to-noise ratio (PSNR) between images test and/or a Structural Similarity Index (SSIM) test can be performed. PSNR and SSIM can be used to compare the image generated by the image generator 235 to the image 210 and/or a saved image previously generated by the image generator 235. Additionally or alternatively, in some implementations, a size (e.g., number of bytes) of the image generated by the image generator 235 can be compared to a threshold value (e.g., maximum and/or minimum number of bytes). In an example implementation, PSNR and/or SSIM passes the test if above a threshold as compared to image 210 and/or a previously generated image.

In other words, the image generated by the image generator 235 can be tested by the test module 240 to determine if the image satisfies at least one predetermined criterion. The criterion can be based on image quality and/or image size. If the image generated by the image generator 235 satisfies the at least one criterion, processing continues to the compression module 245. Otherwise, processing returns to the triangulation module 230.

In some implementations, a first iteration through the triangulation module 230, the image generator 235, and the test module 240 is initialized with an over-complete set of vertices using the fixed-size or parameter adjusted M×M grid. Then, the number of vertices can be pruned to a smaller set of vertices until the set of vertices and the color information can fit in a threshold number of bytes (e.g., 200 bytes).

In this implementation, the triangulation module 230 can be configured to select a vertex to remove and remove the vertex from the set of vertices. In other words, one of the points associated with a pixel described above is removed and no longer used as a vertex.

In some implementations, a first iteration through the triangulation module 230, the image generator 235, and the test module 240 is initialized with a set of vertices that has been minimized or reduced using a greedy algorithm (described in more detail below). Then, the set of vertices can be mutated (described in more detail below) until the set of vertices result in a generated image having an optimal or target quality-vs-size. An optimal quality-vs-size can be reached when mutated vertices do not result in a measurable quality difference between iterations and/or a neglible reduction in the number of bytes for the set of vertices and the color information.

Then, the triangulation module 230 can regenerate the plurality of triangles using one of the techniques described above. The regenerated plurality of triangles can be used by the image generator 235 to generate another image which is then tested by the test module 240.

The compression module 245 can be configured to compress one or more of the vertices (including vertices position in the M×M grid and color) generated by the triangulation module 230, the color table 225 and/or M×M grid. The compression module 245 can use any number of compression techniques. However, in some implementations, the compression module 245 can use an asymmetric numerical systems (ANS) technique which is described in more detail below.

Figure 3:
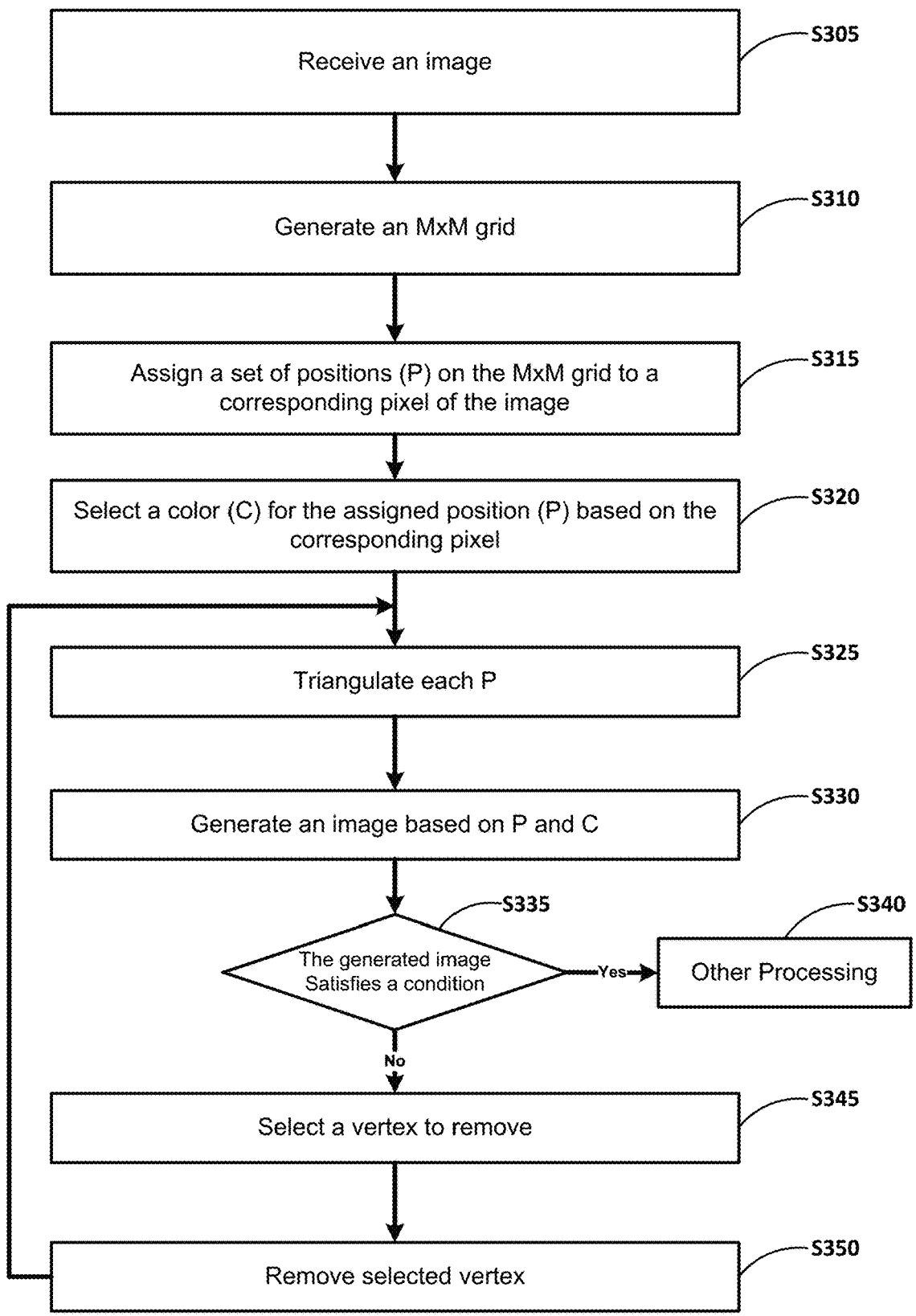
FIG. 3 illustrates a method for generating a triangulated image according to at least one example embodiment.
Figure 4:
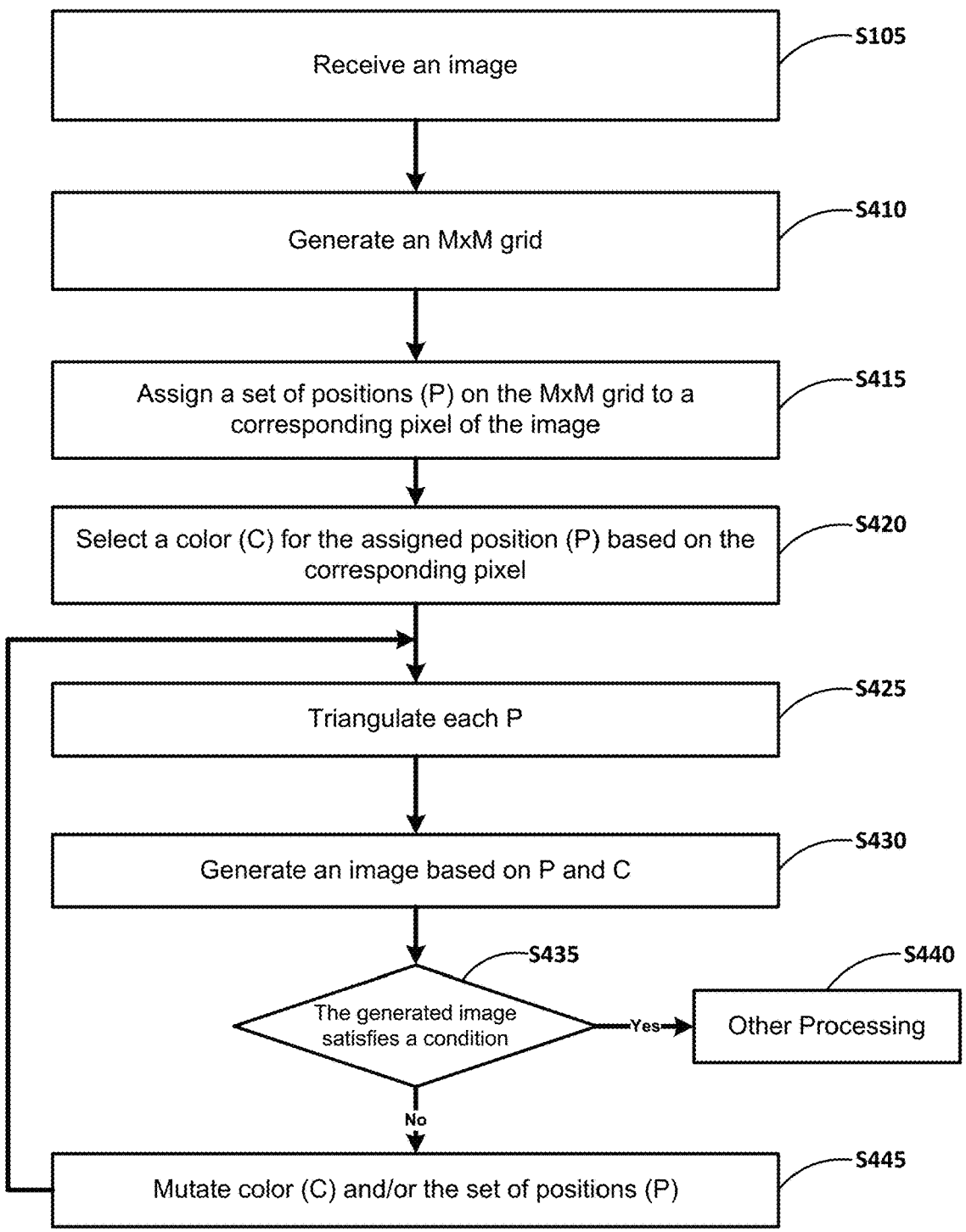
FIG. 4 illustrates a method for generating a triangulated image according to at least one example embodiment.
Figure 8:
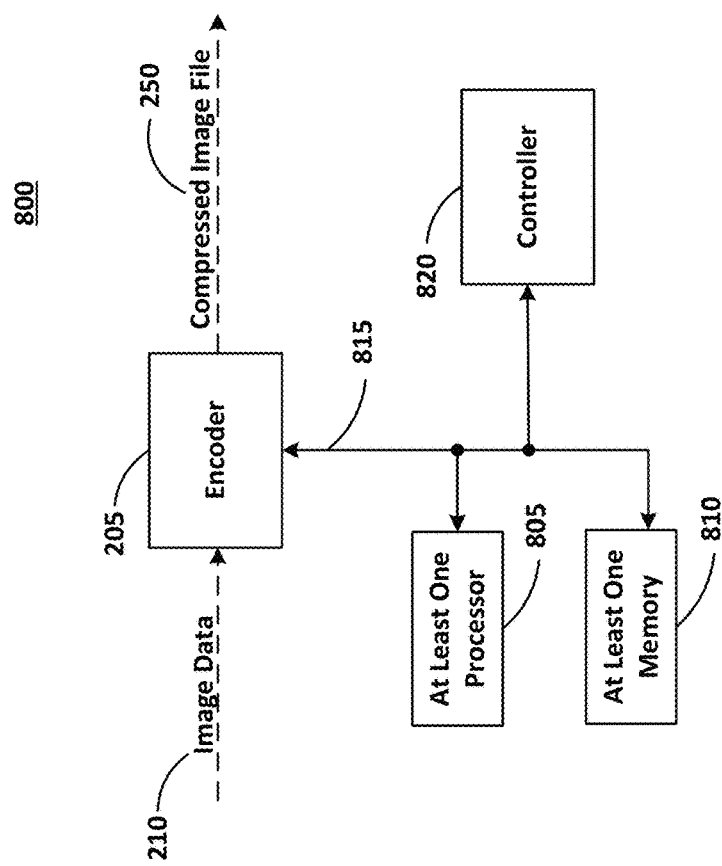
FIG. 8 illustrates an encoder system according to at least one example embodiment.

The method steps described with regard to FIGS. 3 and 4 may be executed as software code stored in a memory (e.g., at least one memory 810) associated with an encoder system (e.g., as shown in FIGS. 1, 2 and 8) and executed by at least one processor (e.g., processor 805) associated with the encoder system. For example, the memory can be a non-transitory computer-readable storage medium having instruction stored thereon as computer executable program code which, when executed on a computer system, causes the computer system to perform steps described below with regard to FIGS. 3 and 4. However, alternative embodiments are contemplated such as an encoder embodied as a special purpose processor.

For example, the method steps may be performed by an application-specific integrated circuit, or ASIC. For example, the ASIC may be configured as the encoder system 205 and/or the controller 820. Although the steps described below are described as being executed by a processor, the steps are not necessarily executed by a same processor. In other words, at least one processor may execute the steps described below with regard to FIGS. 3 and 4.

FIG. 3 illustrates a method for generating a triangulated image according to at least one example embodiment. As shown in FIG. 3, in step S305 an image is received. For example, the image (e.g., image 210) can be a small image (e.g., a thumbnail) of size N×N (e.g., 221×221). The image can include image data (e.g., image size, image dimensions (e.g., x and y dimensions and/or a grid dimension), a number of pixels, pixel location, pixel color, pixel texture, and the like.

In step S310 an M×M grid is generated. For example, the M×M grid can be a predetermined grid having a size that is fixed within an encoder system (e.g., encoder system 205). The M×M grid can be the same size as the N×N grid, a smaller size than the N×N grid or a larger size than the N×N grid. In some implementations, the M×M grid can be predetermined based on a target number of bytes (e.g., 200 bytes). In some implementations, the M×M grid can be predetermined based on an encoder parameter (e.g., an input to the encoder system 205) for adjusting the compression rate. The M×M grid can have a M columns and M rows such that a minimum amount of compression can be achieved.

In step S315 a set of positions (P) on the M×M grid is assign to a corresponding pixel of the image. For example, pixels of the received image (e.g., image 210) can be mapped to respective positions on the M×M grid. The positions on the M×M grid are hereinafter referred to as points or points on the M×M grid. For example, if the M×M grid is a smaller size than the N×N grid (corresponding to the image), mapping the pixels of the image 210 to points on the M×M grid can include mapping a subset of the pixels of the image 210 to points on the M×M grid. In some implementations, an initial assignment of the positions can be preassigned. In some implementations, an initial assignment of the positions can be randomly assigned. In some implementations, an initial assignment of the positions can be assigned to cause an even distribution of points within the M×M grid.

In step S320 a color (C) for the assigned point (P) is selected based on the corresponding pixel. For example, each point on the M×M grid can be assigned a color based on the color of a corresponding pixel in the received image. The color can be selected from a color table. The color table can include a limited number of colors. For example, the color table can include 8-16 colors. Further, each of the colors of the pixels of the image can be mapped to one of the 8-16 colors of color table and the mapped color can be assigned to the corresponding point on the M×M grid.

In step S325 each P is triangulated. For example, a Delaunay triangulation technique can be used. Using a Delaunay triangulation technique, each triangle that is generated by the triangulation module 230 does not include any other points within the generated triangle and no side or edge of a triangle intersects a vertex of another triangle. Therefore each point corresponding to a pixel is used as a vertex in at least one triangle. Other triangulation techniques are possible. For example, some triangulation techniques can include at least one point within a generated triangle. These techniques ignore these internal points in subsequent processing.

In step S330 an image is generated based on P and C. In other words, an image can be generated (or rendered) based on the triangles and the color assigned to the vertex via the corresponding point on the M×M grid. Generating the image can include painting each triangle generated by the triangulation module 230 based on the color assigned to each vertex of the triangle.

In some implementations, at least one triangle can have vertices having different colors. For example, a triangle can have two vertices assigned the color green via the corresponding point on the M×M grid and the third vertex assigned the color blue via the corresponding point on the M×M grid. Accordingly, the triangle can be painted using an interpolation (e.g., linear interpolation) technique. In other words, the triangle can be painted with a varying or blended color. For example, the center of the triangle may be painted green/blue and be painted bluer approaching the blue vertex and be painted greener approaching the green vertices. In addition to linear interpolation, in some implementations, numerous other methods of interpolating the colors to paint the triangles (e.g. cubic, multiquadratic, quintic) can be used.

In step S335 whether the generated satisfies at least one condition is determined. For example, an image quality test can be performed. Therefore, the image can be tested in order to determine whether the image satisfies at least one predetermined criterion. The at least one criterion can be based on image quality and/or image size. For example, a peak signal-to-noise ratio (PSNR) between images test and/or a Structural Similarity Index (SSIM) test can be performed. PSNR and SSIM can be used to compare the image to the received image (e.g., image 210) and/or a saved image generated during a previous iteration. Additionally or alternatively, in some implementations, a size (e.g., number of bytes) of the image can be compared to a threshold value (e.g., maximum and/or minimum number of bytes).

If the generated image passes the test, processing continues to step S340. Otherwise, processing continues to step S345. In step S340, other processing is performed. For example, one or more of the vertices (including position and color), a color table and/or the M×M grid can be compressed.

In step S345 a vertex to remove is selected. For example, a least important vertex can be determined. In some implementations a least important vertex can have a lowest error in the set of vertexes for the triangles used to generate the image. For example, PSNR and SSIM can calculate an error (e.g., an amount of noise) for each vertex. The vertex with the lowest error calculated during the PSNR test or SSIM test can be determined as the least important vertex and selected as the vertex to remove.

In step S350 the selected vertex is removed. For example, the selected vertex is deleted from the set of vertices. In other words, a point is removed from a position on the M×M grid. Then processing returns to step S325. In some implementations, processing can return to step S325 for a minimum or a maximum number of iterations (e.g., processing loops).

In some implementations, the colors of the color table are based on image characteristics. In the implementation described above with regard to FIG. 3, the colors of the color table may be selected once and may not be adapted. Further, the change in any iteration is to remove vertices which may not be added back or moved slightly to find a better combinations of triangles. Still further, using the received image (e.g., image 210) as a baseline results in a greedy choice for every proposed vertex (or set of vertices) modification can limit local search results once regions of high performance are found.

Accordingly, in some implementations, a stochastic variant can be implemented. This can include a technique to search discrete, non-differentiable, optimization landscapes with randomized search heuristics such as hill-climbing, evolutionary algorithms, and/or simulated annealing. For example, a stochastic hill-climbing can allow some implementations to explore the search space of an image and adapt color settings (e.g., of a color table).

Further, at least one of a plurality of operations other than, or in addition to, the remove vertex operation, as described above, can be used. Note that, in some implementations, colors are modified whereas no color modification was in the method described with regard to FIG. 3. Further, vertices can be added (even if they had been previously removed) if they are found to improve the results. Vertices can also make localized moves to nearby grid points. Instead of removing vertices until the desired byte-size is reached, the acceptance of a move can be based on whether a move improves the quality-vs-size. Further, the stochastic implementation (described with regard to FIG. 4) can be initialized with a small set of vertices as compared to the method described with regard to FIG. 3. As described above, the vertices can be on a predetermined grid.

FIG. 4 illustrates a method for generating a triangulated image according to at least one example embodiment. As shown in FIG. 4, in step S405 an image is received. For example, the image can be received as input to a batch encoding routine. For example, the image (e.g., image 210) can be a small image (e.g., a thumbnail) of size N×N (e.g., 221×221). The image can include image data (e.g., image size, image dimensions (e.g., x and y dimensions and/or a grid dimension), a number of pixels, pixel location, pixel color, pixel texture, and the like.

In step S410 an M×M grid is generated. In some implementations, M«N. Therefore, the M×M grid can be much smaller than the N×N grid. For example, M can be between 2 and 20 times smaller than N. Accordingly, M×M can be between 4 and 400 times smaller than N×N. However, the M×M grid can be the same size as the N×N grid, a smaller size than the N×N grid or a larger size than the N×N grid. In some implementations, the M×M grid can be predetermined based on a target number of bytes (e.g., 200 bytes). In some implementations, the M×M grid can be predetermined based on a parameter (e.g., an input to the encoder system 205) for adjusting the compression rate.

Generating the M×M grid can include inserted points into positions on the M×M grid. In some implementations, the set of points can be minimized or reduced using a greedy algorithm. In an example implementation, a threshold number of points can be inserted into positions on the M×M grid. In some implementations, the threshold number of points is much fewer than the number of pixels in the received image. For example, M can be equal to 20. Therefore, the M×M grid can include 400 positions. Accordingly, the threshold number of points can be 400 points maximum. 400 points is much fewer than the number of pixels in the received image (e.g., approximately 50,000 pixels in a thumbnail image). Further, the threshold number of points can be fewer than the number of positions on the M×M grid. For example, the threshold number of points can be set to 300 which is less than the 400 positions.

In an example implementation, the threshold number of points can be randomly inserted into positions on the M×M grid, the points can be assigned a color based on the color of a pixel of the received image that is approximately at a same location in the image as point being assigned a color, an image is generated (or rendered) using the plurality of points of the M×M grid and the generated image compared to the received image. If the comparison (e.g., PSNR) results in a quality that is equal to or less than a threshold quality difference the positions of the points on the M×M grid is acceptable and processing continues. If the comparison (e.g., PSNR) results in a quality that is greater than the threshold quality difference, the threshold number of points can be repositioned on the M×M grid and the process repeats until the generated image is within a threshold quality difference.

In another implementation, pixels can be removed from the received image until a threshold number of pixels remain. Each time a pixel (or a plurality of pixels) is removed, the received image can be compared to the modified image. If the comparison (e.g., PSNR) results in a quality that is equal to or less than a threshold quality difference, the iteration continues, if not, the pixels are added back and other pixels are removed. This process can repeat until the modified image includes the threshold number of pixels or less. The modified image can be used to insert points on the M×M grid and to assign pixels to the points.

In step S415 a set of positions (P) including a point on the M×M grid is assign to a corresponding pixel of the image. For example, the pixels of the received image (e.g., image 210) can be mapped to positions on the M×M grid. The positions on the M×M grid are hereinafter referred to as points or points on the M×M grid if a point has been assigned to position a position.

In step S420 a color (C) for the assigned point (P) is selected based on the corresponding pixel. For example, each point on the M×M grid can be assigned a color based on the color of a corresponding pixel, cluster of pixels and/or center of a cluster of pixels in the received image. The color can be selected from a color table. The color table can be generated based on the received image. For example, a search of the received image returns colors that frequently appear in the received image. The color table should include a limited number of colors. For example, the color table should initially include 8 colors. Therefore, the colors that frequently appear in the received image can be agglomerated or mapped into 8 colors for inclusion in the color table. Further, each of the colors of the pixels of the image can be mapped to one of the 8 colors of color table and the mapped color can be assigned to the corresponding point on the M×M grid. As discussed above, a stochastic hillclimbing technique can be used to determine the colors to include in the color table.

In step S425 each P is triangulated. For example, a Delaunay triangulation technique can be used. Using a Delaunay triangulation technique, each triangle that is generated by the triangulation module 230 does not include any other points within the generated triangle and no side or edge of a triangle intersects a vertex of another triangle. Therefore each point corresponding to a pixel is used as a vertex in at least one triangle. Other triangulation techniques are possible. For example, some triangulation techniques can include at least one point within a generated triangle. These techniques ignore these internal points in subsequent processing.

In step S430 an image is generated based on P and C. In other words, an image can be generated (or rendered) based on the triangles and the color assigned to each vertex via the corresponding point on the M×M grid. Generating the image can include painting triangle generated by the triangulation module 230 based on the color assigned to each vertex of the triangle.

In some implementations, at least one triangle can have vertices having different colors. For example, a triangle can have two vertices assigned the color green via the corresponding point on the M×M grid and the third vertex assigned the color blue via the corresponding point on the M×M grid. Accordingly, the triangle can be painted using an interpolation (e.g., linear interpolation) technique. In other words, the triangle can be painted with a varying or blended color. For example, the center of the triangle may be painted green/blue and be painted bluer approaching the blue vertex and be painted greener approaching the green vertices. In addition to linear interpolation, in some implementations, numerous other methods of interpolating the colors to paint the triangles (e.g. cubic, multiquadratic, quintic) can be used.

In step S435 whether the generated image satisfies at least one condition may be determined. For example, an image quality test can be performed. Therefore, the generated image can be tested in order to determine if the generated image satisfies at least one predetermined criterion. The at least one criterion can be based on image quality, image quality error, and/or image size. For example, a peak signal-to-noise ratio (PSNR) between images and/or a Structural Similarity Index (SSIM) test can be performed. PSNR and SSIM can be used to compare the generated image to the received image (e.g., image 210) and/or a saved image generated during a previous iteration. Additionally or alternatively, in some implementations, a size (e.g., number of bytes) of the image can be compared to a threshold value (e.g., a maximum size (e.g., number of bytes) and/or minimum size (e.g., number of bytes)).

If the generated image passes the test, processing continues to step S440. Otherwise, processing continues to step S445. In step S440, other processing is performed. For example, one or more of the vertices (including position within the M×M grid and color), a color table and/or the M×M grid can be compressed.

In step S445 the set of points and/or the color of the points is mutated. In other words, the vertices of the triangles can be modified. This may be achieved in a variety of ways, for example at least one of: (a) a vertex can be displaced—displacing a vertex includes moving the vertex one of horizontally or vertically one grid position; (b) a vertex can be added—adding a vertex can include adding a point on the M×M grid at a random (unoccupied) position on the M×M grid (the added vertex can, in some embodiments, be assigned a color assigned to an adjacent point or closest point); (c) a vertex can be removed. The displaced or removed vertex may be a least important vertex. Additionally alternatively, in some embodiments a random vertex may be removed or displaced.

Mutation of the color of a point may include one or more of: (a) a point's (resulting in a vertex) color can be reassigned—the color can be reassigned randomly using any color in the color table; (b) a color can be added to the color table; (c) a color can be removed from the color table—in some implementations a color of the color table can be removed if the color is assigned to fewer than a threshold number of points; (d) a color of the color table can be modified—modifying a color can include changing its color value by a number (e.g., by adding or subtracting one from the color value).

Mutation type decisions can be iterative. In other words, first add a vertex, then displace a vertex, then reassign a color and so forth (this order is only an example, any order is within the scope of this disclosure). Mutation type decisions can be learned. For example, as mutation is performed, the optimal mutation (or order of mutations) can be learned. In other words, the system can learn that displacing a vertex can be more effective than removing a vertex for an image (or a plurality of images).

In some implementations, two or more modifications can be performed. Further, modifications can be selected based on probability of success. For example, an algorithm can be used to determine probability of success. The algorithm can be based on historical data (e.g., indicating displacing a vertex is most likely to result in an improvement) and/or prior modifications (e.g., after displacing a vertex horizontally, displacing the vertex vertically is most likely to result in an improvement). In some implementations two or more vertices of the triangles can be modified. For example, a set of adjacent vertices can be modified, a set of vertices in a region can be modified, a set of vertices having a same color can be modified, and/or the like. In some implementations, two or more vertices of the triangles can be modified sequentially. For example, vertices along a horizontal can be modified left to right in sequential iterations.

Although FIG. 4 shows processing returning to step S425, other options are within the scope of this disclosure. For example, if only a color is modified, processing can return to step S430. For example, if the current iteration is a second or subsequent iteration and the mutation does not result in an improved result (e.g., reduced error and/or size), the mutation can be discarded and step S445 can be repeated from a previous iteration.

Returning to FIG. 2, the compression module 245 can be configured to compress triangulation data and generate the compressed image file 250. For example, the compressed image file can include a header containing basic parameters such as the grid size (e.g., the M×M grid) and the number of vertices, and the color table(s). In some implementations, the color table(s) can be compressed (e.g., losslessly compressed) using an asymmetric numerical systems (ANS) technique.

In some implementations, the color-table entries can be sorted by frequency of use (starting with the most common). After sorting, the color table can be compressed by giving the number of colors, the (quantized) color channel values, and/or the usage frequencies for each of the entries. In some implementations, the the color channel values can be coded as a correction from the average of the previously transmitted values for that channel (e.g., the red channel), with the first entry's prediction set to the mid-point gray.

In some implementations, the histogram table for these color differences can be included in the header. In some implementations, the color-entry frequencies can be stored using a binomial distribution model. Therefore, this implementation can use a fair selection model on the remaining colors and vertices (i.e., $N=V_{C_r}$ where $V_{C_r}$ is the number of remaining vertices, not counted by the previous color entries and $p=1/C_r$ where $C_r$ is the remaining color-table entries). In some implementations, because the color table can be been sorted by frequency, this implementation can improve on this probability model by limiting the considered values of the distribution to be at least $V_{C_r}/C_r$ (based on knowing that the upcoming entries have been sorted) and at most the frequency count of the previous entry (based on knowing that the previous and current entries have been sorted). In some implementations, using this implementation to color-entry frequency coding, this apporach can save significant amount of the file size, on average, compared with using a simple uniform-probability model of the distributions.

In some implementations, the triangulation can be compressed (e.g., losslessly compressed) using an asymmetric numerical systems (ANS) technique to compress the vertex locations and/or their color assignments. In some implementations, for the vertex locations, one bit (without arithmetic coding) per position on the M×M grid can be used to indicate whether the position is used as a vertex (e.g., a point is at the position). In some implementations, this can use $N_g$ bits, where $N_g$ is the number of positions on the M×M grid and corresponds to using a 0.5 probability of occupancy. In some implementations, this technique can use a fixed probability of occupancy as $p=V_t/N_g$ where $V_t$ is the total number of vertices (which can be included in the header).

In some implementations, run-length codes (coding the run length of unoccupied grid positions between vertices) can be used. The distribution of run-lengths can be included in the header resulting in additional overhead (e.g., compressed image file 250 may be larger than desired). In some implementations, the compression of the triangulation can use an adaptive-probability technique to compress the occupancy map. In some implementations, a probability model can be updated with progression through the grid, so that at each position on the M×M grid the probability model is $p=V_r/N_r$ where $V_r$ and $N_r$ are the remaining vertex and grid point counts, respectively. In some implementations, this can provide a compress the triangulation significantly more than the single-bit-per-gridpoint technique.

In some implementations, the color table index (for each vertex or point on the M×M grid) can be compressed (e.g., losslessly compressed) using an asymmetric numerical systems (ANS) technique. For example, the color-entry frequencies can be used, and adaptive models for these indices can be used. The color index can be compressed as a chain of Boolean encodings. This technique includes identifying each color index with a probability indicated by the remaining count probability for the corresponding color-table entry. In addition, the order of encoding each color index can be set by a spatially adaptive prediction.

In some implementations, this technique can help even without changing any of the model probabilities because once a true Boolean value is identified, encoding can be terminated for that vertex and move to the next one. In some implementations, the order of encoding can be determined by sorting the previously seen (and already included in the compressed image file 250) colors based on the colors Manhattan distance to the current vertex. Ties (e.g., a same Manhattan distance) broken in favor of the more probable color. In some implementations, using this ordering results in a significant reduction in file size (e.g., compressed image file 250) for storing the color-table frequencies. In some implementations, using the spatially-adaptive ordering can provide an additional file-size reduction.

In some implementations, for client-side decoding, the Delaunay triangulation can be recreated. In some implementations, each triangle is then individually colored by a linear combination of its three vertices. In addition to linear interpolation, in some implementations, numerous other methods of interpolating the colors to paint the triangles (e.g. cubic, multiquadratic, quintic) can be used.

Figure 5:
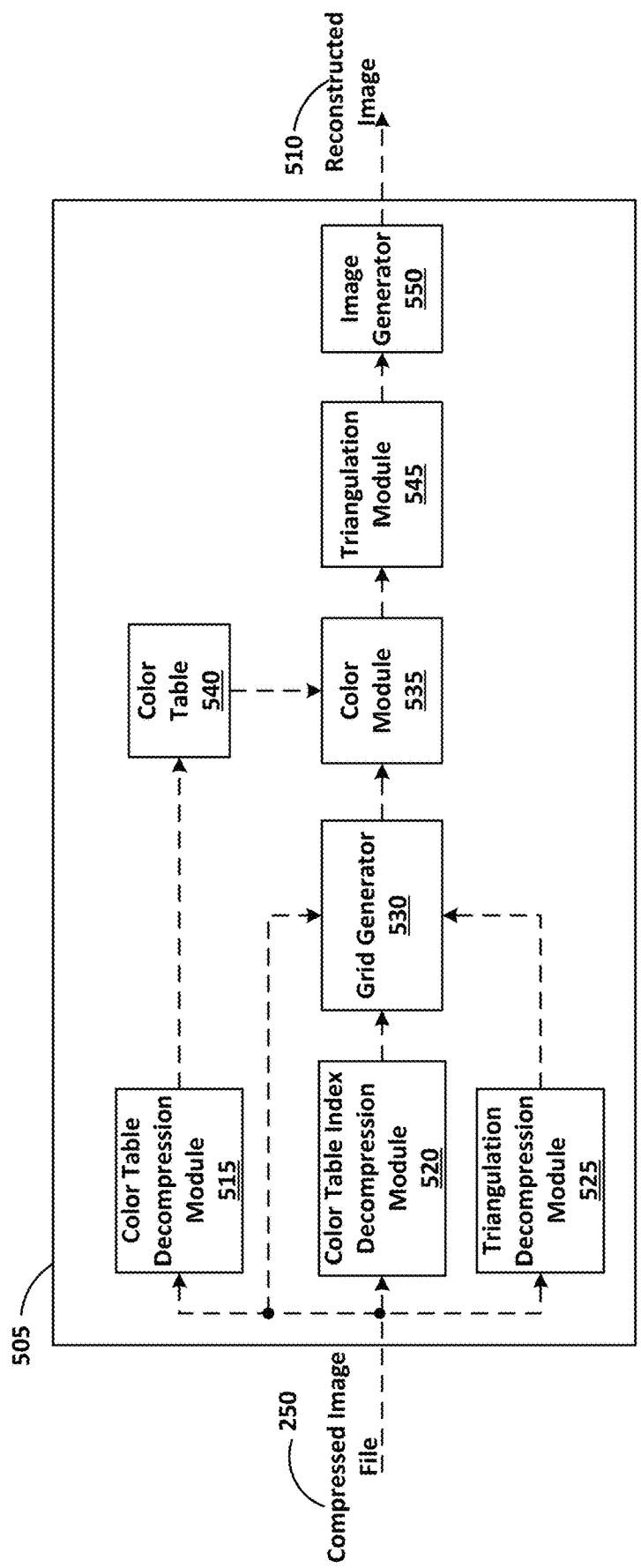
FIG. 5 illustrates a decoder system according to at least one example embodiment.

FIG. 5 illustrates a decoder system according to at least one example embodiment. As shown in FIG. 5, a decoder system 505 includes a color table decompression module 515, a color table index decompression module 520, a triangulation decompression module 525, a grid generator 530, a color module 535, a color table 540, a triangulation module 545, and an image generator 550. The decoder system 505 can be configured to receive a compressed image file 250 and generate a reconstructed image 510. Although the color table decompression module 515, the color table index decompression module 520, and the triangulation decompression module 525 are shown as separate modules, the functionality of the color table decompression module 515, the color table index decompression module 520, and/or the triangulation decompression module 525 can be incorporated into a common or single decompression module.

The color table decompression module 515 is configured to decompress a compressed color table read from the compressed image file 250 and to generate the color table 540. Decompressing the compressed color table can include performing the reverse of the technique used by the compression module 245 to compress the color table 225. For example, the color table can be dequantized and the color channel values can be regenerated based on the previous color entry where the first entry is predicted using the mid-point gray. Additionally or alternatively, the color table decompression module 515 can extract color frequency information from the compressed image file 250 and include the color frequency information in the color table 405. The color frequency information can be extracted using a uniform-probability model and/or a distribution model.

The color table index decompression module 520 is configured to decompress a compressed color table index file read from the compressed image file 250 and to communicate the color index table to the grid generator 530. Decompressing the compressed color table can include performing the reverse of the technique used by the compression module 245 to compress the color table index. The color table index decompression module 520 can decompress the color index table using a chain of Boolean decodings technique. This technique includes identifying each color index with a probability indicated by the remaining count probability for the corresponding color table entry. Additionally or alternatively, the order of decoding each color index can be set by a spatially adaptive prediction.

The triangulation decompression module 525 is configured to decompress a triangulation file read from the compressed image file 250 and to communicate the triangulation file to the grid generator 530. Decompressing the compressed triangulation file can include performing the reverse of the technique used by the compression module 245 to compress the triangulation file. For example, the triangulation decompression module 525 can read a number of vertices, a grid size and a probability model from the header. The probability model can indicate the likelihood that a position in the grid includes a vertex and whether a first grid position includes a vertex. As position includes (or does not include) a vertex, the probability that the next point does not include (or includes) increases.

The grid generator 530 is configured to generate an M×M grid based on a grid size read from the header. The grid generator 530 is further configured to assign a point at each position of the M×M grid that is occupied (e.g., includes a vertex) based on the decompressed triangulation file. The grid generator 530 is further configured to assign a color index value to each of the points.

The color module 535 is configured to assign a color to each of the points based on the color index value. For example, the color index value can be used to look up a color in the color table 540. The returned color (or value used to render a color) is assigned to the corresponding point.

The triangulation module 545 can be configured to generate a plurality of triangles (e.g., as described above) using the points on the M×M grid as vertices for the triangles. For example, a Delaunay triangulation technique can be used. Using a Delaunay triangulation technique, each triangle that is generated by the triangulation module 545 does not include any other points within the generated triangle and no side or edge of a triangle intersects a vertex of another triangle. Therefore each point corresponding to a pixel is used as a vertex in at least one triangle. Other triangulation techniques are possible. For example, some triangulation techniques can include at least one point within a generated triangle. These techniques ignore these internal points in subsequent processing.

Image generator 550 can be configured to generate reconstructed image 510. In other words, image generator 550 can be configured to generate (or render) an image using the triangulation and the color assigned to the vertex via the corresponding point on the M×M grid. Generating the image can include painting each triangle generated by the triangulation module 545 based on the color assigned to each vertex of the triangle.

In some implementations, at least one triangle can have vertices having different colors. For example, a triangle can have two vertices assigned the color green via the corresponding point on the M×M grid and the third vertex assigned the color blue via the corresponding point on the M×M grid. Accordingly, the triangle can be painted using an interpolation (e.g., linear interpolation) technique. In other words, the triangle can be painted with a varying or blended color. For example, the center of the triangle may be painted green/blue and be painted bluer approaching the blue vertex and be painted greener approaching the green vertices. In addition to linear interpolation, in some implementations, numerous other methods of interpolating the colors to paint the triangles (e.g. cubic, multiquadratic, quintic) can be used.

Figure 6:
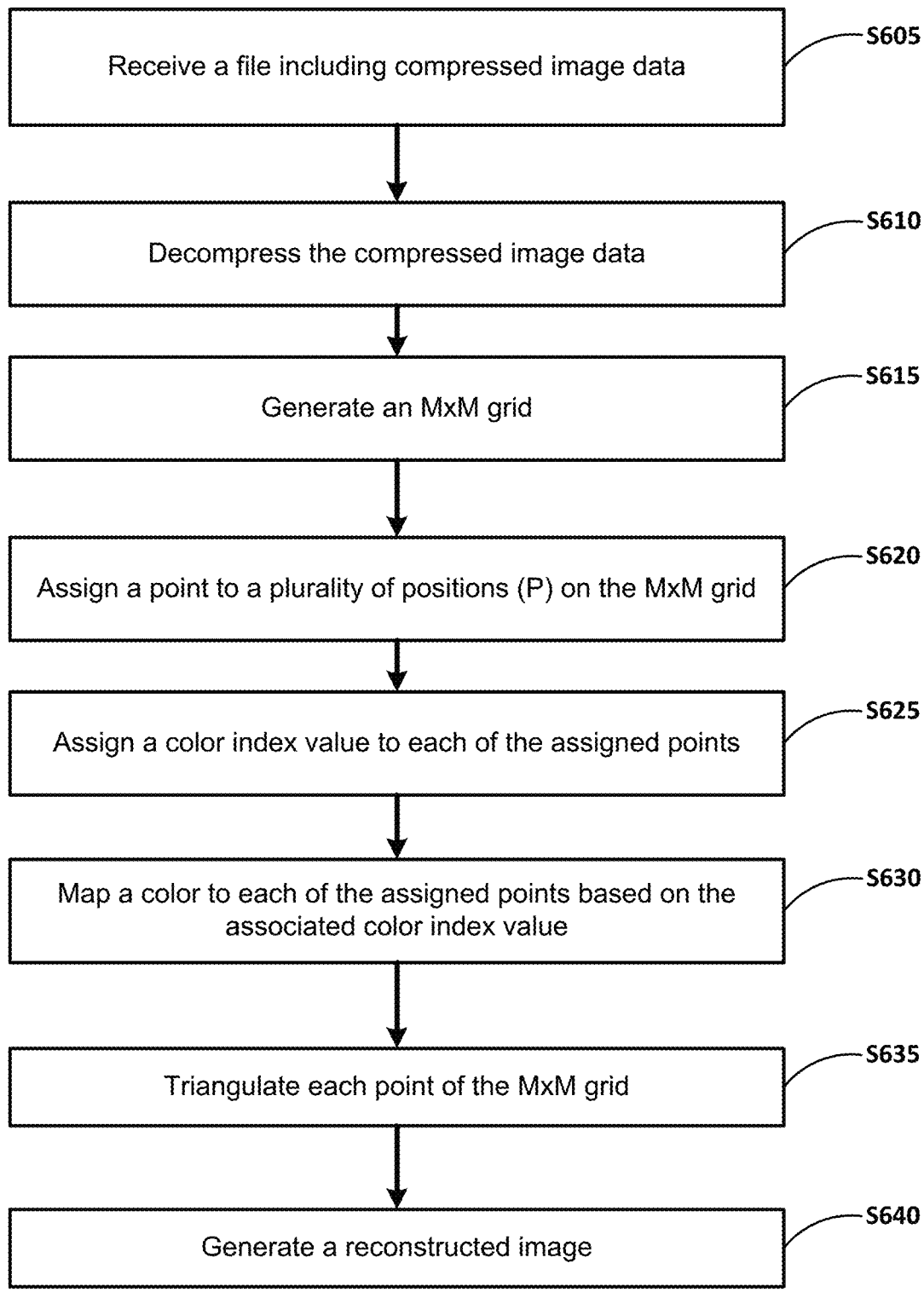
FIG. 6 illustrates a method for decoding image data and generating a reconstructed image according to at least one example embodiment.
Figure 7:
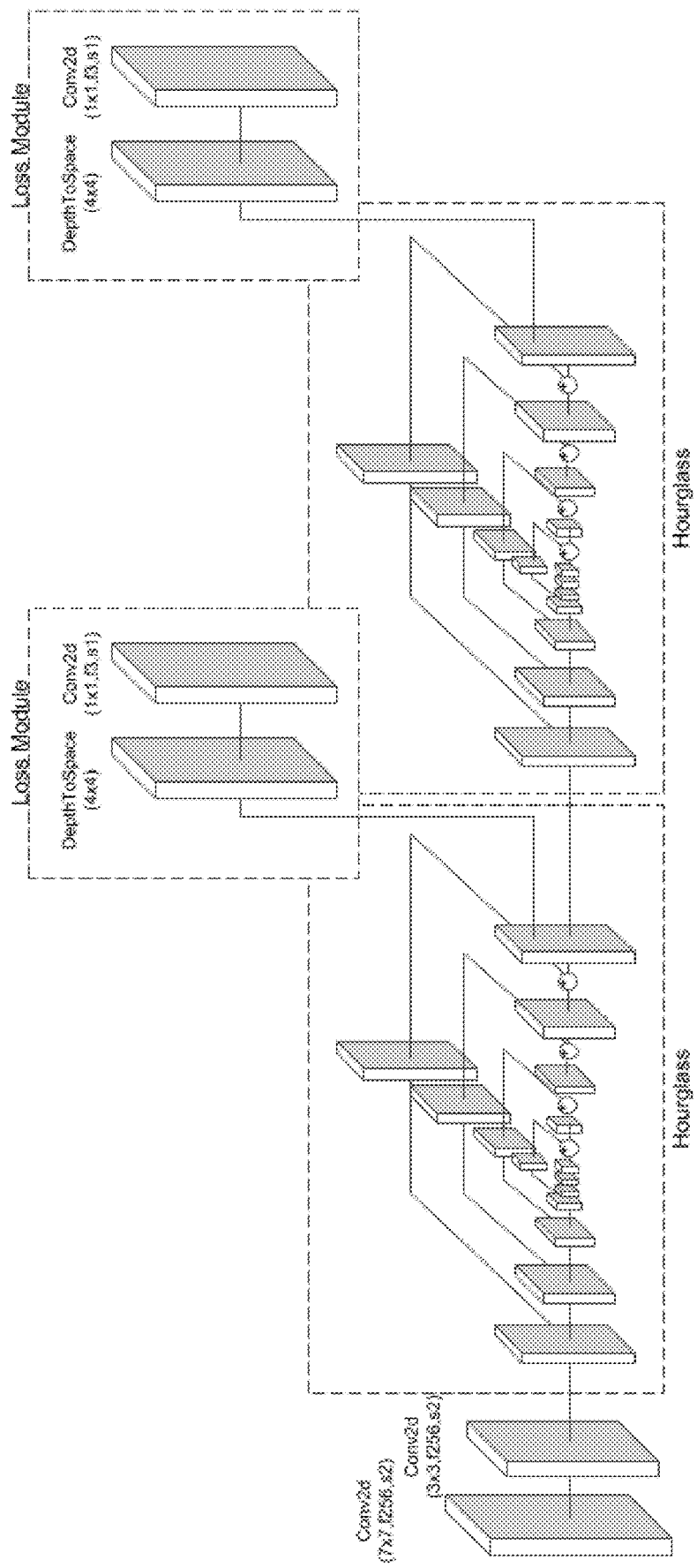
FIG. 7 illustrates a Stacked-Hourglass network including intermediate loss according to at least one example embodiment.
Figure 9:
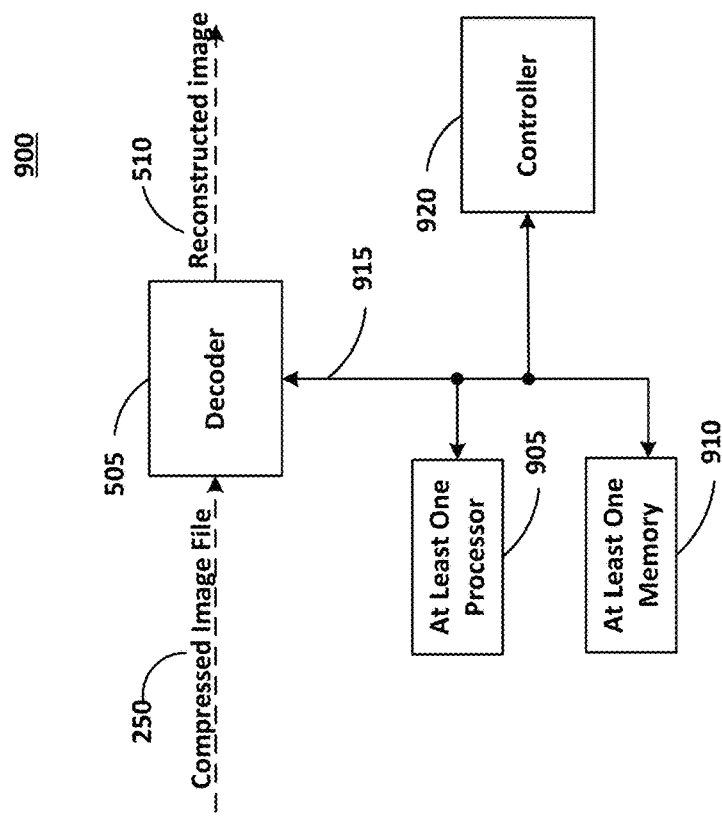
FIG. 9 illustrates a decoder system according to at least one example embodiment.

The method steps described with regard to FIG. 6 may be executed as software code stored in a memory (e.g., at least one memory 910) associated with an decoder system (e.g., as shown in FIGS. 7 and 9) and executed by at least one processor (e.g., processor 905) associated with the decoder system. For example, the memory can be a non-transitory computer-readable storage medium having instruction stored thereon as computer executable program code which, when executed on a computer system, causes the computer system to perform steps described below with regard to FIG. 6. However, alternative embodiments are contemplated such as a decoder embodied as a special purpose processor.

For example, the method steps may be performed by an application-specific integrated circuit, or ASIC. For example, the ASIC may be configured as the decoder system 505 and/or the controller 920. Although the steps described below are described as being executed by a processor, the steps are not necessarily executed by a same processor. In other words, at least one processor may execute the steps described below with regard to FIG. 6.

FIG. 6 illustrates a method for decoding image data and generating a reconstructed image according to at least one example embodiment. As shown in FIG. 6, in step S605 a file (e.g., compressed image file 250) including compressed image data is received. For example, the file can be received via a communication network (e.g., the Internet) in response to a request from a mobile device (or other computing device).

In step S610 the compressed image data is decompressed. For example, the file can include a plurality of types of compressed image data. The types of compressed image data can include at least one of a compressed color table, a compressed triangulation (including locations of vertices of a triangle and color assignments), and a compressed color table index.

Decompressing the compressed color table can include performing the reverse of the technique used to compress the color table. For example, the color table can be dequantized and the color channel values can be regenerated based on the previous color entry where the first entry is predicted using the mid-point gray. Decompressing the compressed color table can include performing the reverse of the technique used to compress the color table index. The color index table can be decompressed using a chain of Boolean decodings technique. This technique includes identifying each color index with a probability indicated by the remaining count probability for the corresponding color table entry. In addition, the order of decoding each color index can be set by a spatially adaptive prediction.

Decompressing the compressed triangulation file can include performing the reverse of the technique used to compress the triangulation file. For example, a number of vertices, a grid size and a probability model can be read from a header of the file including the compressed image data. The probability model can indicate the likelihood that a position in the grid includes a vertex and whether a first grid position includes a vertex. As position includes (or does not include) a vertex, the probability that the next point does not include (or includes) increases.

In step S615 an M×M grid is generated. For example, the M×M grid can be generated based on a grid size read from the header. Generating the M×M grid can include assigning a point at each position of the M×M grid that is occupied (e.g., includes a vertex) based on the decompressed triangulation file. Generating the M×M grid can include assigning a color index value to each of the points.

In step S620 a point is assign to a plurality of positions (P) on the M×M grid. For example, a point can be assigned to each position of the M×M grid that is occupied (e.g., includes a vertex) based on the decompressed triangulation file. Generating the M×M grid can include assigning a color index value to each of the points.

In step S625 a color index value is assigned to each of the assigned points. For example, a color index value can be assigned to each point of the M×M grid based on the decompressed triangulation file and/or the decompressed color table index.

In step S630 a color is mapped to each of the assigned points based on the associated color index value. For example, the color index value can be used to look up a color in the decompressed color table. The returned color (or value used to render a color) is assigned to the corresponding point.

In step S635 each point of the M×M grid is triangulated. For example, a Delaunay triangulation technique can be used. Using a Delaunay triangulation technique, each triangle that is generated by the triangulation module 230 does not include any other points within the generated triangle and no side or edge of a triangle intersects a vertex of another triangle. Therefore each point corresponding to a pixel is used as a vertex in at least one triangle. Other triangulation techniques are possible. For example, some triangulation techniques can include at least one point within a generated triangle. These techniques ignore these internal points in subsequent processing.

In step S640 a reconstructed image is generated. In other words, an image (e.g., reconstructed image 510) can be rendered based on the triangles and vertex colors. For example, generating the reconstructed image can include painting each triangle generated by the triangulation process based on the color assigned to each point corresponding to a vertex of the triangle.

In some implementations, at least one triangle can have vertices having different colors. For example, a triangle can have two vertices assigned the color green via the corresponding point on the M×M grid and the third vertex assigned the color blue via the corresponding point on the M×M grid. Accordingly, the triangle can be painted using an interpolation (e.g., linear interpolation) technique. In other words, the triangle can be painted with a varying or blended color. For example, the center of the triangle may be painted green/blue and be painted bluer approaching the blue vertex and be painted greener approaching the green vertices. In addition to linear interpolation, in some implementations, numerous other methods of interpolating the colors to paint the triangles (e.g. cubic, multiquadratic, quintic) can be used.

In some implementations, the reconstructed image (e.g., reconstructed image 510) can include jagged edges in some portions the image. Further, the reconstructed image can include discontinuities in straight lines that can be caused by triangle boundaries. In some implementations, the jagged edges and discontinuities can be prevalent in the edges of a first reconstructed image. In some implementations, each triangle is painted using the colors of its own vertices. However, the vertices of nearby triangles can include valuable information when, for example, the vertices are assigned the same (or nearly same) color. In some implementations, for example, in a second reconstructed image triangles can include shading differences. In some implementations, it can be desirable to use this consistency information across triangles to re-render the reconstructed image.

In some implementations, a deep neural network can be used to implicitly create rules to address the jagged edges and discontinuities the edges of a reconstructed image based on image statistics. In some implementations, to train the deep neural network, the same inputs from the triangulation as were used to create reconstructed images can be used. In some implementations, for the target output, the original image can be used. In some implementations, the training can include using the train-set from Imagenet.

In some implementations, a variety of deep convolutional networks can be used in object detection and recognition, the end result of object detection and recognition can be a classification. In some implementations, a sparse input can be used to generate a full image. This can be formulated or referred to as an image translation task. In some implementations, the result of object detection and recognition can be a full image. Therefore, being able to recreate details from the inputs while allowing for non-spatially local influences to direct larger features and impose global consistency can be possible. In some implementations, the need to have both details from the original image and potentially global coordination of the generated image has resulted in a variety of fine→coarse→fine architectures such as hourglass and u-net. In some implementations, these architectures pass the inputs through a series of convolution layers that progressively downsample the image. After the smallest layer is reached, the process can be reversed and the image can be expanded to a desired size.

In some implementations, inputs can be composed of 8 channels including the edge image—a binary image showing the edges created by the Delaunay triangulation, a binary vertex presence image, the image as a result of the linear interpolations, and/or RGB color vertex image. In some implementations, this can indicate the color assigned to each vertex (black everywhere else).

FIG. 7 illustrates a Stacked-Hourglass network including intermediate loss according to at least one example embodiment. As shown in FIG. 7, a Conv2d(size=7×7, filters=256, stride=2) can be applied to a 256×256×8 input, then a Conv2d(3×3, f256, s2) to bring the dimensions to 64×64× 256. This feeds into an Hourglass with Depth-ToSpace(2×2) for upsampling. The first Hourglass' output is then appended to the next Hourglass' input. The inputs can be represented as 256×256 images with 8 channels, and a batch size of 32. The output can be an RGB image of the same resolution.

In an example implementation, a reconstructed image (e.g., reconstructed image 510) generated using the triangulation techniques described above can be improved (e.g., have higher quality, less noise and/or less error) and/or converted to a full image (e.g., larger size, more pixels and/or higher resolution). Accordingly, the reconstructed image can be resized to a 256×256 image using linear interpolation. As discussed above, inputs to the deep convolutional network (e.g., the Stacked-Hourglass network of FIG. 7) can include 8 channels. The resized reconstructed image can be used as input to channels 3-5 of the deep convolutional network. The triangulation data (e.g., as generated by triangulation module 545) can include an edge map that can be used as input to channel 1 of the deep convolutional network. The triangulation data (e.g., as generated by triangulation module 545) can include a vertex location map that can be used as input to channel 2 of the deep convolutional network. Finally, the triangulation data (e.g., as generated by triangulation module 545) can include a vertex color data that can be used as input to channels 6-8 of the deep convolutional network. Following the execution of the deep convolutional network, an RGB image based on the reconstructed image (e.g., reconstructed image 510) is output. The RGB image can have a higher quality than the reconstructed image. The RGB image can be rendered or output on the display of a computing device.

In some implementations, an intermediate supervision can be applied using an intermediate loss module that can be split off the output of each Hourglass (e.g., at least two hourglasses) of the Stacked-Hourglass network. In some implementations, the intermediate loss module can be a DepthToSpace(4×4) and a Conv2d(1×1, c3, s1) with a tanh activation to result in a 256×256 RGB image. In some implementations, a mean-squared-error loss can be applied between the 256×256 RGB image and the original image. In some implementations, a network's prediction can be the output of the intermediate loss module of the second (or final) Hourglass. In some implementations, Batch Norm can be used with the Adam Optimizer with learning rate of 0.1 and espilon of 1.0.

FIG. 8 illustrates the encoder system 800 according to at least one example embodiment. The encoder system 800 may be understood to include various standard components which may be utilized to implement the techniques described herein, or different or future versions thereof. As shown in FIG. 8, the encoder system 800 includes the at least one processor 805, the at least one memory 810, a controller 820, and the encoder system 205. The at least one processor 805, the at least one memory 810, the controller 820, and the encoder system 205 are communicatively coupled via bus 815.

The at least one processor 805 may be configured to execute computer instructions associated with the controller 820 and/or the encoder system 205. The at least one processor 805 may be a shared resource. For example, the encoder system 800 may be an element of a larger system (e.g., a network computer, a web server and/or the like). Therefore, the at least one processor 805 may be configured to execute computer instructions associated with other elements (e.g., serving webpage requests, streaming video and/or the like) within the larger system.

The at least one memory 810 may be configured to store data and/or information associated with the encoder system 800. For example, the at least one memory 810 may be configured to store color tables, iteration data (e.g., a set of vertices, data to be compressed, modified vertex information, and/or the like). For example, the at least one memory 810 may include buffers storing in-process data and/or compressed data (e.g., a compressed image file 250) prior to permanent storage. For example, the at least one memory 810 may be configured to store models, neural networks, training algorithms, parameters, datastores and the like.

The controller 820 may be configured to generate various control signals and communicate the control signals to various blocks in encoder system 800. The controller 820 may be configured to generate the control signals in accordance with the methods described above. The controller 820 may be configured to control the encoder system 205 to encode image data using triangulation according to example embodiments as described herein. For example, the controller 820 may generate and communicate a control signal(s)

indicating a triangulation technique, test methods, at least one test criterion and/or associated parameters.

FIG. 9 illustrates a decoder system according to at least one example embodiment. In the example of FIG. 9, a decoder system 900 may be at least one computing device and should be understood to represent virtually any computing device configured to perform the methods described herein. As such, the decoder system 900 may be understood to include various standard components which may be utilized to implement the techniques described herein, or different or future versions thereof. By way of example, the decoder system 900 is illustrated as including at least one processor 905, as well as at least one memory 910 (e.g., a computer readable storage medium), a controller 920, and the decoder system 505. The at least one processor 905, the at least one memory 910, the controller 920, and the decoder system 505 are communicatively coupled via bus 915.

The at least one processor 905 may be utilized to execute instructions stored on the at least one memory 910 to implement the various features and functions described herein, or additional or alternative features and functions. The at least one processor 905 and the at least one memory 910 may be utilized for various other purposes. For example, the at least one memory 910 may represent an example of various types of memory and related hardware and software which might be used to implement any one of the modules described herein. According to example embodiments, the encoder system 800 and the decoder system 900 may be included in a same larger system. Further, the at least one processor 805 and the at least one processor 905 may be a same at least one processor and the at least one memory 810 and the at least one memory 910 may be a same at least one memory. Still further, the controller 820 and the controller 920 may be a same controller.

The at least one processor 905 may be configured to execute computer instructions associated with the controller 920 and/or the decoder system 505. The at least one processor 905 may be a shared resource. For example, the decoder system 900 may be an element of a larger system (e.g., a mobile device, a client device and/or the like). Therefore, the at least one processor 905 may be configured to execute computer instructions associated with other elements (e.g., web browsing or wireless communication) within the larger system.

The at least one memory 910 may be configured to store data and/or information associated with the decoder system 900. For example, the at least one memory 910 may be configured to store a model and parameters associated with the geometric data, and/or the like.

The controller 920 may be configured to generate various control signals and communicate the control signals to various blocks in decoder system 900. The controller 920 may be configured to generate the control signals in accordance with the methods described above. The controller 920 may be configured to control the decoder system 505 to decode compressed data associated with geometric data using a model and parameters according to example embodiments as described above.

Figure 10:
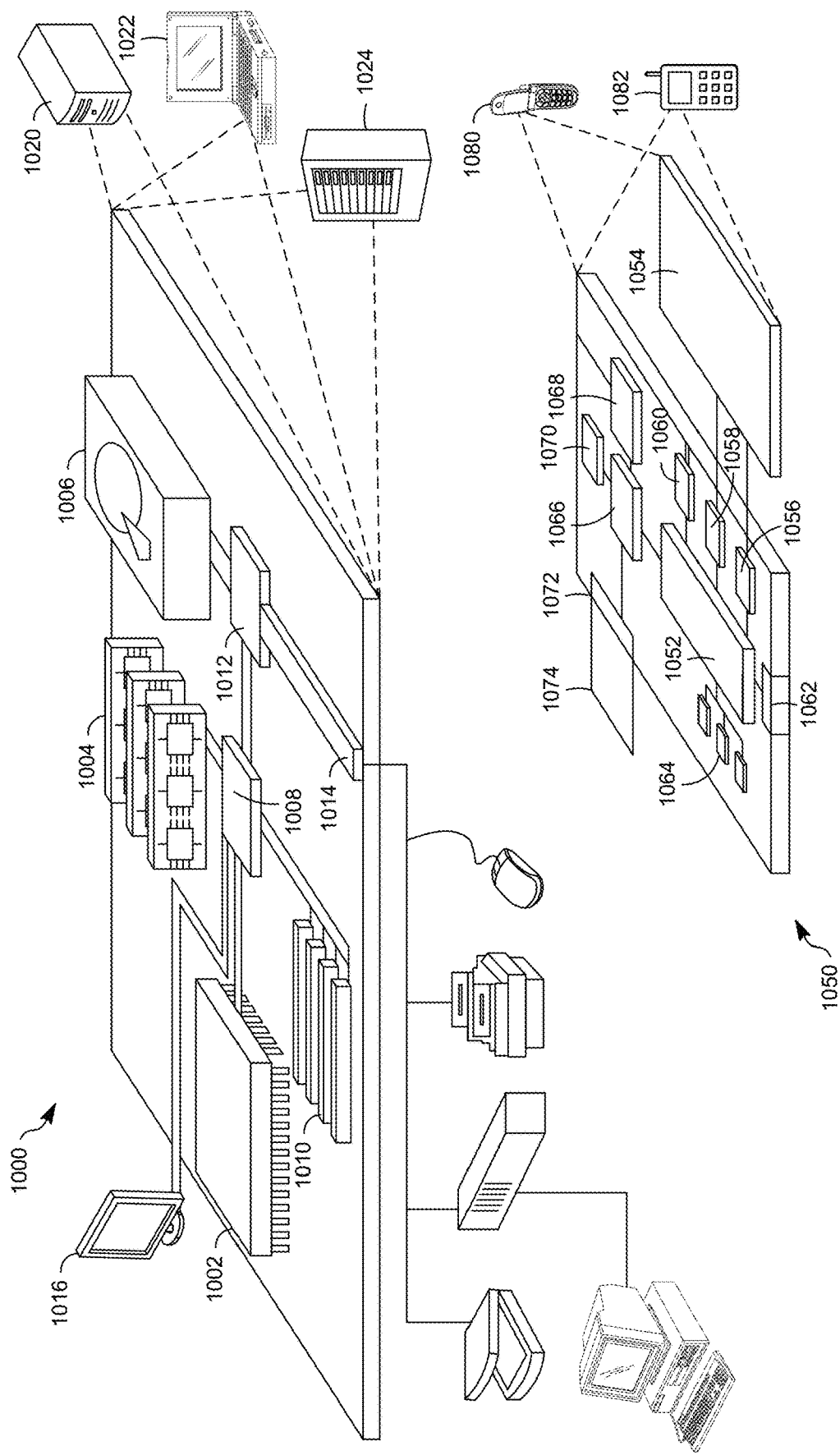
FIG. 10 shows an example of a computer device and a mobile computer device according to at least one example embodiment.

FIG. 10 shows an example of a computer device 1000 and a mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. 10 computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. An encoder system comprising:
   a pixel grid generator configured to:
   receive an image having a first dimension,
   generate a grid having a second dimension,
   add a plurality of points to positions on the grid, and
   map a plurality of pixels of the image to the plurality of points;

a color module configured to assign a color to each of the plurality of points using a color table;
a triangulation module configured to generate a plurality of vertices based on the plurality of points and triangulate the grid using the vertices;
a test module configured to reposition the plurality of points on the grid in response to determining a quality that is greater than a threshold quality; and
a compression module configured to compress the vertices as a set of compressed vertex positions and a set of vertex colors.

2. The encoder system of claim 1, wherein the second dimension is between four (4) and 400 times smaller than the first dimension.

3. The encoder system of claim 1, wherein
the second dimension is M,
the grid includes M columns and M rows,
the positions on the grid are located at each block of the grid, a block being at an intersection of a row and a column of the grid, and
the adding of the plurality of points to the positions on the grid includes one of inserting a point at each of the positions on the grid or inserting the plurality of points at a portion of the positions on the grid.

4. The encoder system of claim 1, wherein
the received image is a first image,
the second dimension is M,
the grid includes M columns and M rows,
the positions on the grid are located at each block of the grid, a block being at an intersection of a row and a column of the grid, and
the adding of the plurality of points to the positions on the grid includes:
inserting a threshold number of points into random positions on the grid,
generating a second image using the points on the grid,
comparing the second image to the first image, and
in response to determining the comparison results in a quality that is greater than a threshold quality difference, the threshold number of points are repositioned on the grid.

5. The encoder system of claim 1, wherein
the color table is generated based on the received image, and
the color table includes between 8 and 16 colors.

6. The encoder system of claim 1, wherein
the color table is generated based on the received image, and
the color table includes 6 colors.

7. The encoder system of claim 1, wherein the triangulation module uses a Delaunay Triangulation technique to triangulate the grid.

8. The encoder system of claim 1, wherein the received image is a first image, the encoder system further comprising:
an image generator configured to generate a second image using the triangulated grid and a color associated with the vertices, wherein
the generating of the second image includes painting triangles generated by the triangulation module based on a color associated with each a plurality of vertices.

9. The encoder system of claim 1, wherein the received image is a first image, the encoder system further comprising:
an image generator configured to generate a second image using the triangulated grid and a color associate with the vertices; and
the test module is configured to:
perform a quality test based on the first image and the second image,
determine whether the second image satisfies at least one criterion based on the quality test and a size of the second image, wherein the at least one criterion includes a maximum size and quality error,
in response to determining the second image does not satisfy the at least one criterion, select a vertex from the plurality of vertices and remove the selected vertex from the plurality of vertices and return processing to the triangulation module.

10. The encoder system of claim 1, wherein the received image is a first image, the encoder system further comprising:
an image generator configured to generate a second image using the triangulated grid and a color associate with the vertices; and
the test module is configured to:
perform a quality test based on the first image and the second image,
determine whether the second image satisfies at least one criterion based on the quality test and a size of the second image, wherein the at least one criterion includes a maximum size and quality error,
in response to determining the second image does not satisfy the at least one criterion, at least one of:
displacing a vertex of the plurality vertices,
adding a vertex to the plurality vertices,
removing a vertex from the plurality of vertices,
reassigning the color associated with at least one of the plurality of points,
removing one of the colors of the color table, and
modifying one of the colors of the color table, and
return processing to the triangulation module.

11. A method of compressing an image, the method comprising:
receiving an image having a first dimension;
generating a grid having a second dimension;
adding a plurality of points to positions on the grid;
mapping a plurality of pixels of the image to the plurality of points;
assigning a color to each of the plurality of points using a color table;
generating a plurality of vertices based on the plurality of points;
triangulating the grid using the vertices;
repositioning the plurality of points on the grid in response to determining a quality that is greater than a threshold quality; and
compressing the vertices as a set of compressed vertex positions and a set of vertex colors.

12. The method of claim 11, wherein
the second dimension is M,
the grid includes M columns and M rows,
the positions on the grid are located at each block of the grid, a block being at an intersection of a row and a column of the grid, and
the adding of the plurality of points to the positions on the grid includes one of inserting a point at each of the positions on the grid or inserting the plurality of points at a portion of the positions on the grid.

13. The method of claim 11, wherein
the received image is a first image,
the second dimension is M,
the grid includes M columns and M rows, the positions on the grid are located at each block of the grid, a block being at an intersection of a row and a column of the grid, and the adding of the plurality of points to the positions on the grid includes:

inserting a threshold number of points into random positions on the grid, generating a second image using the points on the grid, comparing the second image to the first image, and in response to determining the comparison results in a quality that is greater than a threshold quality difference, the threshold number of points are repositioned on the grid.

14. The method of claim 11, wherein the triangulation uses a Delaunay Triangulation technique to triangulate the grid.

15. The method of claim 11, wherein the received image is a first image, the method further comprising:

generating a second image using the triangulated grid and a color associated with the vertices, wherein the generating of the second image includes painting triangles generated by the triangulation based on a color associated with each a plurality of vertices.

16. The method of claim 11, wherein the received image is a first image, the method further comprising:

generating a second image using the triangulated grid and a color associate with the vertices;

performing a quality test based on the first image and the second image;

determining whether the second image satisfies at least one criterion based on the quality test and a size of the second image, wherein the at least one criterion includes a maximum size and a quality error;

in response to determining the second image does not satisfy the at least one criterion, selecting a vertex from the plurality of vertices and removing the selected vertex from the plurality of vertices; and returning to the triangulating step.

17. The method of claim 11, wherein the received image is a first image, the method further comprising:

generating a second image using the triangulated grid and a color associate with the vertices;

performing a quality test based on the first image and the second image;

determining whether the second image satisfies at least one criterion based on the quality test and a size of the second image, wherein the at least one criterion includes a maximum size and quality error;

in response to determining the second image does not satisfy the at least one criterion, at least one of:

displacing a vertex of the plurality vertices, adding a vertex to the plurality vertices, removing a vertex from the plurality of vertices, reassigning the color associated with at least one of the plurality of points, removing one of the colors of the color table, and modifying one of the colors of the color table, and returning to the triangulating step.

18. A method of decompressing a compressed image, the method comprising:

receiving a compressed image file, the compressed image file including at least one of a header, a compressed color table, a compressed color table index, and a compressed triangulation;

decompressing at least one of the compressed color table, the compressed color table index, and the compressed triangulation;

generating a grid having an M×M dimension based on a grid size;

assigning one of a plurality points to each position of the grid based on the decompressed triangulation file;

assigning a color index value to each of the plurality of points based on the decompressed triangulation file;

mapping a color to each of the plurality of points based on an associated color index value;

triangulating the grid using the plurality of points as vertices;

generating a reconstructed image based on the vertices and triangles associated with the triangulation; and using a convolution network to at least one of improve a quality associated with the reconstructed and increase a size of the reconstructed image.

19. The method of claim 18, wherein the convolution network includes a Stacked-Hourglass network, and the Stacked-Hourglass network includes at least two hourglasses, and an intermediate supervision is applied using an intermediate loss module that can be split off an output of each Hourglass.

20. The method of claim 18, wherein generating the reconstructed image includes painting triangles generated by the triangulation based on a color associated with each a plurality of vertices, and at least one of the triangles generated by the triangulation painted using an interpolation technique.

* * * * *